US007085875B1

(12) United States Patent
Yona et al.

(10) Patent No.: US 7,085,875 B1
(45) Date of Patent: Aug. 1, 2006

(54) MODULAR SWITCH WITH DYNAMIC BUS

(75) Inventors: Nir Yona, Bet Dagan (IL); Yosef Ben Moshe, Holon (IL); Dori Yitzhaki, Tel Mond (IL); Michael Feldman, Rishon Lezion (IL); Gidi Navon, Tel Aviv (IL); Jacob Shimoni, Raanana (IL)

(73) Assignee: Avaya Communication Israel Ltd., Tel Aviv (IL)

( * ) Notice: Subject to any disclaimer, the term of this patent is extended or adjusted under 35 U.S.C. 154(b) by 696 days.

(21) Appl. No.: 09/544,054

(22) Filed: Apr. 6, 2000

(51) Int. Cl.
*G06F 13/40* (2006.01)
*G08C 15/00* (2006.01)
*H03K 19/007* (2006.01)

(52) U.S. Cl. .................. 710/307; 710/316; 370/233; 370/395.21; 375/240

(58) Field of Classification Search ............. 710/107, 710/116, 104, 316; 370/388, 399, 395, 362, 370/352; 379/399, 229; 709/225; 712/20; 361/686; 439/630, 61
See application file for complete search history.

(56) References Cited

U.S. PATENT DOCUMENTS

| 4,933,845 A | * | 6/1990 | Hayes ........................ 710/104 |
| 5,307,506 A |   | 4/1994 | Colwell et al. |
| 5,452,330 A | * | 9/1995 | Goldstein ................ 370/395.1 |
| 5,467,348 A | * | 11/1995 | Fujii et al. ................... 370/399 |
| 5,625,780 A | * | 4/1997 | Hsieh et al. ................ 710/316 |
| 5,734,656 A | * | 3/1998 | Prince et al. ................ 370/362 |
| 5,768,270 A | * | 6/1998 | Ha-Duong .................. 370/388 |
| 5,771,358 A | * | 6/1998 | LaBerge ..................... 710/107 |
| 5,838,681 A | * | 11/1998 | Bonomi et al. ............. 710/116 |
| 5,875,351 A | * | 2/1999 | Riley ........................... 710/22 |
| 5,901,332 A | * | 5/1999 | Gephardt et al. ............ 710/116 |
| 5,982,634 A |   | 11/1999 | Wronski et al. |
| 5,993,261 A | * | 11/1999 | Klatt et al. .................. 439/630 |
| 6,016,528 A | * | 1/2000 | Jaramillo et al. ............ 710/107 |
| 6,047,288 A | * | 4/2000 | Kurosawa et al. ............. 707/10 |
| 6,094,715 A | * | 7/2000 | Wilkinson et al. ............. 712/20 |
| 6,126,451 A | * | 10/2000 | Zandy et al. .................. 439/61 |
| 6,147,863 A | * | 11/2000 | Moore et al. ................ 361/686 |
| 6,219,706 B1 | * | 4/2001 | Fan et al. .................... 709/225 |
| 6,400,819 B1 | * | 6/2002 | Nakano et al. ............. 379/229 |
| 6,513,078 B1 | * | 1/2003 | Kaganoi et al. ............. 710/104 |
| 6,751,214 B1 | * | 6/2004 | Parruck et al. .............. 370/352 |
| 2001/0043700 A1 | * | 11/2001 | Shima et al. .......... 379/399.01 |

FOREIGN PATENT DOCUMENTS

WO    WO 93/15464    8/1993

OTHER PUBLICATIONS

"Draft Standard P802.1Q/D9, IEEE Standards for Local and Metropolitan Area Networks: Virtual Bridged Local Area Networks", 1998. pp. 1-87.
"Lucent Technologies Introduces ATM Functionality for Cajun M770 Switch", BusinessWire, Apr. 6, 1999.

* cited by examiner

*Primary Examiner*—Christopher E. Lee

(57) ABSTRACT

A modular switch, comprising a plurality of backplane sub-buses; a plurality of cards which are each allocated one or more of the backplane sub-buses; and a controller which dynamically allocates the backplane sub-buses to the plurality of cards, based on the bandwidth needs of the cards. Preferably, the bandwidth capacity of substantially all the backplane sub-buses is less than the sum of the maximal transmission bandwidth capacities of the cards.

17 Claims, 8 Drawing Sheets

FIG. 4

| CARD | LIST OF OWNED BUSES | N | N_DES | N_min | PR | DB | DB-1 | DB+1 | ALLOC BUSES |
|---|---|---|---|---|---|---|---|---|---|
| 1 | 9,12 | 2 | | | | | | | |
| 2 | 3 | 1 | | | | | | | |
| 3 | 8 | 1 | | | | | | | |
| 6 | 5,7,13 | 3 | | | | | | | |
| 8 | 20 | 1 | | | | | | | |
| 9 | 17 | 1 | | | | | | | |
| 10 | 14 | 1 | | | | | | | |
| 13 | 6,22 | 2 | | | | | | | |
| 15 | 11,15 | 2 | | | | | | | |
| FREE SUB BUSES | 1,2,4,10,16,18,19,21,23 | | | | | | | | |

MODULAR SWITCH WITH DYNAMIC BUS

FIELD OF THE INVENTION

The present invention relates to communication networks and in particular to modular switches of local area networks.

BACKGROUND OF THE INVENTION

Many modular switches include a plurality of cards which are connected by a backbone bus with a limited bandwidth. Generally, a box of the modular switch comprises a plurality of slots for receiving cards, the slots being connected by the backbone bus.

When the number of slots in the modular switch is relatively large and/or the amount of bandwidth needed by each card is large, the bandwidth of a bus which allows all the cards to transmit their entire capacity concurrently when all the slots are full with cards, may be very large. A bus with such a large bandwidth is very expensive and is not generally necessary as substantially nobody uses all the cards at maximal capacity at the same instant. Therefore, it is common to use a bus with a lower bandwidth. It is required, however, that the use of a lower bandwidth bus have minimal impact on the user of the switch.

Some modular switches divide the bus into fixed portions which are assigned to the various slots of the switch. In a first variation, all the bus portions have the same bandwidth which is lower than the maximal bandwidth capacity of the cards. The user therefore must make sure that no card reaches its capacity, or the traffic of the card will be blocked. In a second variation, some slots are assigned a large bus portion which is sufficient for the card it carries even in its full capacity, and other slots are assigned smaller bus portions. The bus portions assigned to the slots are either predefined at the manufacturing of the switch or are configured by a system manager in charge of the switch. These switches are limiting as they require that the cards be placed in specific slots or that the switch be configured each time a card is moved.

In some switches, the bus is divided into sub-buses of the size of the maximal capacity of the cards. The sub-buses are allocated to the cards using time domain multiplexing. Such multiplexing, however, is wasteful as it gives all the cards the some amount of bandwidth regardless of their needs. In addition, this solution adds delay to packets received by a card when it is not its turn to use the bus. In some buses which use time domain multiplexing, the bus is divided into slots, and each time a transmitter needs to transmit data it requests an amount of slots. This solution, however, is too slow and complex for fast switches.

In many organizations it is desired to limit the flow of data between computers. For example, it may be desired that engineers of a first project not have access to files describing a second project. In such cases separate networks are laid out for the different groups which need to talk to each other. In addition, for redundancy it is sometimes desired to have two separate networks with limited or no interconnections. Thus, if a device connected to one of the networks blocks the usage of the network to which it belongs, the other network may still be used. Furthermore, in some cases it is desired to form separate connections using different protocols, such as Ethernet and ATM, which cannot be interconnected without signal conversions. A simple solution is to create separate networks using a plurality of different switches which are not interconnected. This solution is, however, expensive and inflexible.

Another solution known in the art is to define separate virtual local area networks (VLANs) which are implemented on a single network. Each packet transmitted through a VLAN supporting network carries TAG information which states the identities of the VLANs to which the packet belongs. The packet is passed only through ports which are configured to receive packets of the specific VLAN. The problem with this solution is that the packets themselves carry the direction information, and if this information is changed, intentionally or unintentionally, the packets may be passed through the wrong port. Also, changing the configuration of the VLANs of the ports is generally allowed separately by each computer, requiring separate protections on each computer to prevent unauthorized changing of the definitions of the VLANs of the ports. An emerging standard for VLANs is described in "Draft Standard P802.1Q/D9, IEEE Standards for Local and Metropolitan Area Networks: Virtual Bridged Local Area Networks", 1998, the disclosure of which is incorporated herein by reference.

There exist boxes which include within them both an Ethernet switch and an ATM switch. Some of these boxes have a predetermined first group of slots for ATM cards and a predetermined second group for Ethernet cards. These boxes, however, define a fixed border between the ATM and Ethernet switches and do not allow shifting of cards from one switch to the other, according to the current needs of the user. Others of these boxes, such as of the Meritage switch available from Lucent, include two busses, one for ATM cards and one for Ethernet cards. Such a switch requires a bus of double size than a switch which supports only a single protocol.

There also exist cards which perform conversion of signals from a first protocol to a different protocol of the bus. For example, an ATM card which receives ATM signals may convert its signals to Ethernet signals for transmission over an Ethernet bus. Such conversion cards are naturally more complex than simple single protocol cards.

Some modular switches in accordance with the token ring protocol include a plurality of slots into which cards are inserted. By leaving empty slots between groups of cards, a plurality of separate rings are formed.

SUMMARY OF THE INVENTION

One aspect of some preferred embodiments of the present invention relates to a modular switch having a plurality of backplane sub-buses and a plurality of cards which are allocated one or more of the backplane sub-buses for transmission. A controller preferably dynamically allocates the sub-buses to the cards according to the momentary bandwidth needs of the cards. Thus, each card, regardless of the slot in which it is located, receives bandwidth according to its needs, and if it so requires, receives bandwidth sufficient for its maximal capacity.

In a preferred embodiment of the invention, the controller periodically receives messages from the cards, which messages notify the current bandwidth needs of the transmitting cards. Alternatively or additionally, the controller listens to the sub-buses currently allocated to the cards and accordingly determines the bandwidth needs of the cards.

Preferably, each sub-bus is allocated at most to a single card such that no more than one card transmits to a sub-bus at any time, implementing a "one write, many read" system. In a preferred embodiment of the invention, all the sub-buses have a common size. Alternatively, some of the sub-buses have different sizes than others.

In a preferred embodiment of the invention, the total bandwidth of the sub-buses of the modular switch is less than the maximal combined transmission capacity of the cards of the switch.

Preferably, each card is allocated an initial first sub-bus for transmission. If the card requires additional bandwidth it is allocated more sub-buses until its needs are fulfilled. Thus, the card uses a variable fraction of its maximal capacity according to the needs of the ports of the card. In some preferred embodiments of the invention, a large number of relatively small sub-buses are defined, so as to increase the possibility of achieving an optimal allocation of the bus in which none of the cards is short of communication bandwidth. In other preferred embodiments of the invention, a small number of relatively large sub-buses are defined so as to simplify the management of allocation of the sub-buses.

An aspect of some preferred embodiments of the present invention relates to a method of allocating sub-buses to cards of a switch. The method is preferably performed periodically and/or when a request for bandwidth is received from one or more of the cards. A bus demand value is preferably assigned to each of the cards and any free sub-buses which are not allocated to any card, are allocated to the cards with the highest bus demand values. Preferably, when there are no remaining free sub-buses, the controller determines whether to confiscate sub-buses from one or more cards.

In a preferred embodiment of the invention, in determining whether to confiscate a sub-bus, the controller calculates a corrected bus demand value of the card with the highest bus demand value, as if the card received another sub-bus. In addition, a corrected bus demand value of the card with the lowest bus demand value is calculated as if a sub-bus was confiscated from the card. The corrected bus demand values are preferably compared, and if the corrected bus demand value of the card with the lowest bus demand value is lower than the corrected bus demand value of the card with the highest bus demand value a sub-bus is confiscated from the card with the lowest bus demand value so that the sub-bus can be allocated to the card with the highest bus demand value.

In a preferred embodiment of the invention, the method of allocating the sub-buses is performed by a dynamically chosen card of the switch.

An aspect of some preferred embodiments of the present invention relates to a modular switch with a backbone bus divided into sub-buses. At least one of the sub-buses is listened to by less than all the cards of the switch. Preferably, each card listens to messages from a respective group of other cards. In a preferred embodiment of the invention, a network administrator configures the modular switch, defining which cards listen to which other cards. Preferably, the defining of which cards listen to which other cards defines work groups, the members of each work group listening to messages from all the other cards of the work group.

In a preferred embodiment of the invention, the sub-buses to which each card transmits are adjusted dynamically, and therefore the sub-buses to which each card listens are adjusted dynamically according to the cards currently transmitting to the sub-buses.

The work groups may be defined for security reasons in order to prevent unauthorized users from listening to traffic not directed to their computer. Alternatively or additionally, the work groups are defined for redundancy purposes, so that a failure of one card does not prevent the use of at least some of the other cards of the switch. Furthermore, different cards may be used with different protocols, e.g., a first group of cards which support the ATM protocol and a separate group of cards which support Ethernet may be included in a single modular switch.

The work groups may be defined to change dynamically according to the time of day, for example in order to add security during nights and vacations.

There is therefore provided in accordance with a preferred embodiment of the present invention, a modular switch, including a plurality of backplane sub-buses, a plurality of cards which are each allocated one or more of the backplane sub-buses, and a controller which dynamically allocates the backplane sub-buses to the plurality of cards, based on the bandwidth needs of the cards.

Preferably, the bandwidth capacity of substantially all the backplane sub-buses is less than the sum of the maximal transmission bandwidth capacities of the cards. Preferably, the controller is implemented by one of the cards. Further preferably, the controller is implemented by one of the cards which is selected dynamically. Preferably, the cards transmit messages which indicate their bandwidth needs to the controller.

Preferably, each of the cards has a priority value which indicates its entitlement to bandwidth and the controller allocates the backplane sub-buses based on the priority values of the cards. Preferably, substantially all the backplane sub-buses have the same bandwidth capacity. Alternatively, the plurality of backplane sub-buses include at least two sub-buses with different bandwidths.

Preferably, the controller confiscates one or more sub-buses from one or more of the cards when the one or more sub-buses are more needed by one or more other cards. Preferably, the controller does not allocate a confiscated sub-bus to a card before it receives confirmation from the card from which the sub-bus was confiscated that the sub-bus was freed from its allocation. Preferably, the controller calculates, for each of the cards, a bus demand value which represents the entitlement and need of the card to receive a sub-bus, and the controller allocates free sub-buses which are not allocated to the cards with the highest bus demand values. Preferably, the controller confiscates sub-buses from cards whose bus demand value without the confiscated sub-buses is lower than the bus demand value of a different card after the confiscated sub-buses are transferred to it.

There is further provided in accordance with a preferred embodiment of the present invention, a modular switch, including a plurality of backplane sub-buses and a plurality of cards which are configurable to listen to a variable number of the backplane sub-buses.

Preferably, at least one of the plurality of cards listens to fewer than all the backplane sub-buses. Preferably, the switch includes a controller which dynamically changes the sub-buses to which each card listens. Preferably, each of the cards is configured to listen to a respective group of peer cards. Preferably, the sub-buses to which each of the plurality of cards listens are the sub-buses to which the respective group of peer cards transmit.

Preferably, each card listens to the cards which listen to it. Alternatively, at least one card listens to fewer than all the cards that listen to it. Preferably, the peer group of one or more cards changes as a function of time. Preferably, the peer groups are reduced in size during high security times. Preferably, the switch includes for at least one of the cards a filter which passes to the card only data from the sub-buses top which the card listens.

There is further provided in accordance with a preferred embodiment of the present invention, a method of allocating sub-buses to cards of a switch, including determining the bandwidth needs of each of the cards, assigning each of the cards a bus demand value which is a function of the bandwidth needs of the card and the current bandwidth allocated to the card; and allocating the sub-buses to the cards based on the bus demand values of the cards.

Preferably, determining the bandwidth needs of the cards includes receiving messages from the cards. Alternatively or additionally, determining the bandwidth needs of a card includes determining a measure of the utilization of the sub-buses currently allocated to the card. Further alternatively or additionally, determining the bandwidth needs of a card includes listening to the sub-buses currently allocated to the card.

Preferably, assigning each of the cards a bus demand value includes assigning a bus demand value which is a function of the priority of the card. Preferably, assigning each of the cards a bus demand value includes assigning a bus demand value which is a function of the minimal number of sub-buses which must be allocated to the card. Preferably, allocating the sub-buses to the cards includes allocating sub-buses not currently allocated to a specific card as additional sub-buses to the cards with the highest bus demand values. Preferably, allocating the sub-buses to the cards includes confiscating sub-buses from cards which have lower bus demand values without the confiscated sub-buses than the bus demand values of other cards with the confiscated sub-buses.

There is further provided in accordance with a preferred embodiment of the present invention, a modular switch, including a plurality of communication cards, a plurality of backplane sub-buses which are used for communication between groups of the cards, and at least one controller which is configurable to divide the cards into different numbers of groups, such that the cards of the different groups do not transmit data to each other.

Preferably, the at least one controller is configurable to divide the cards into any number of groups between one and the number of cards. Preferably, the at least one controller divides the cards into a number of groups configured by a user. Preferably, the at least one controller divides the cards into a number of groups equal to the number of types of cards included in the plurality of cards. Preferably, the cards of the different groups do not communicate with each other. Preferably, the cards of the different groups do not communicate over any of the plurality of backplane sub-buses.

Preferably, the switch includes a box having a plurality of slots in which the cards are located and wherein the cards of at least one group are not located in adjacent slots. Preferably, only one card writes to a sub-bus at any single time.

BRIEF DESCRIPTION OF FIGURES

The invention will be more clearly understood by reference to the following description of preferred embodiments thereof in conjunction with the figures, in which:

FIG. 4 is a schematic illustration of a database of a switch controller, in accordance with a preferred embodiment of the present invention;

DETAILED DESCRIPTION OF THE PREFERRED EMBODIMENTS

Figure 1A:
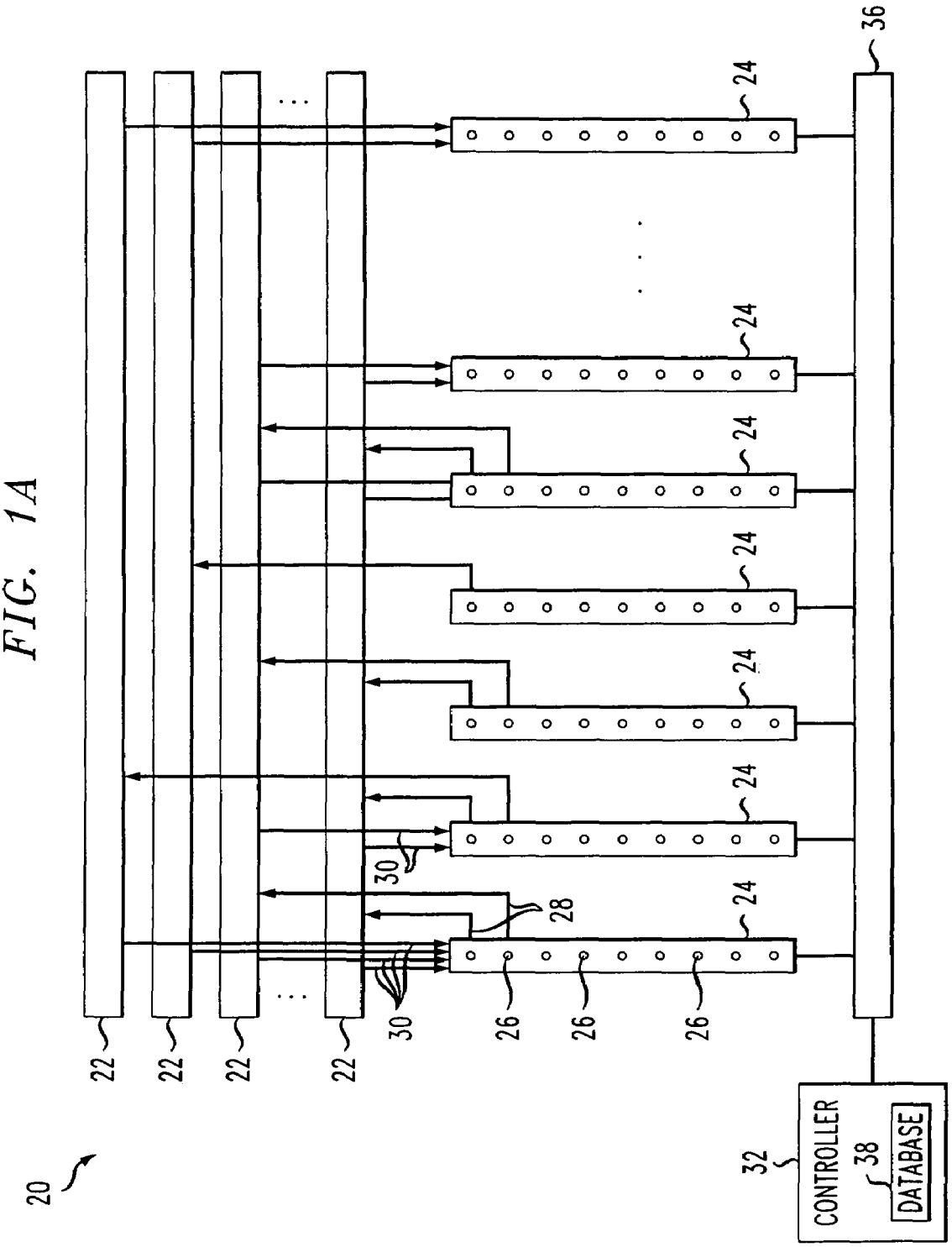
FIG. 1A is a schematic illustration of a modular switch, in accordance with a preferred embodiment of the present invention.

FIG. 1A is a schematic illustration of a modular switch 20, in accordance with a preferred embodiment of the present invention. Switch 20 comprises a plurality of cards 24 to which computers or other devices connect. Preferably, cards 24 comprise a plurality of ports 26 to which the computers connect. Switch 20 preferably also comprises a plurality of sub-buses 22 which are used for communication between cards 24. Preferably, each card 24 has a plurality of output links 28 which connect the card to the buses 22 to which it transmits. In addition, each card 24 preferably has a plurality of input links 30 with which card 24 listens to the sub-buses it is assigned to listen to.

Figure 1B:
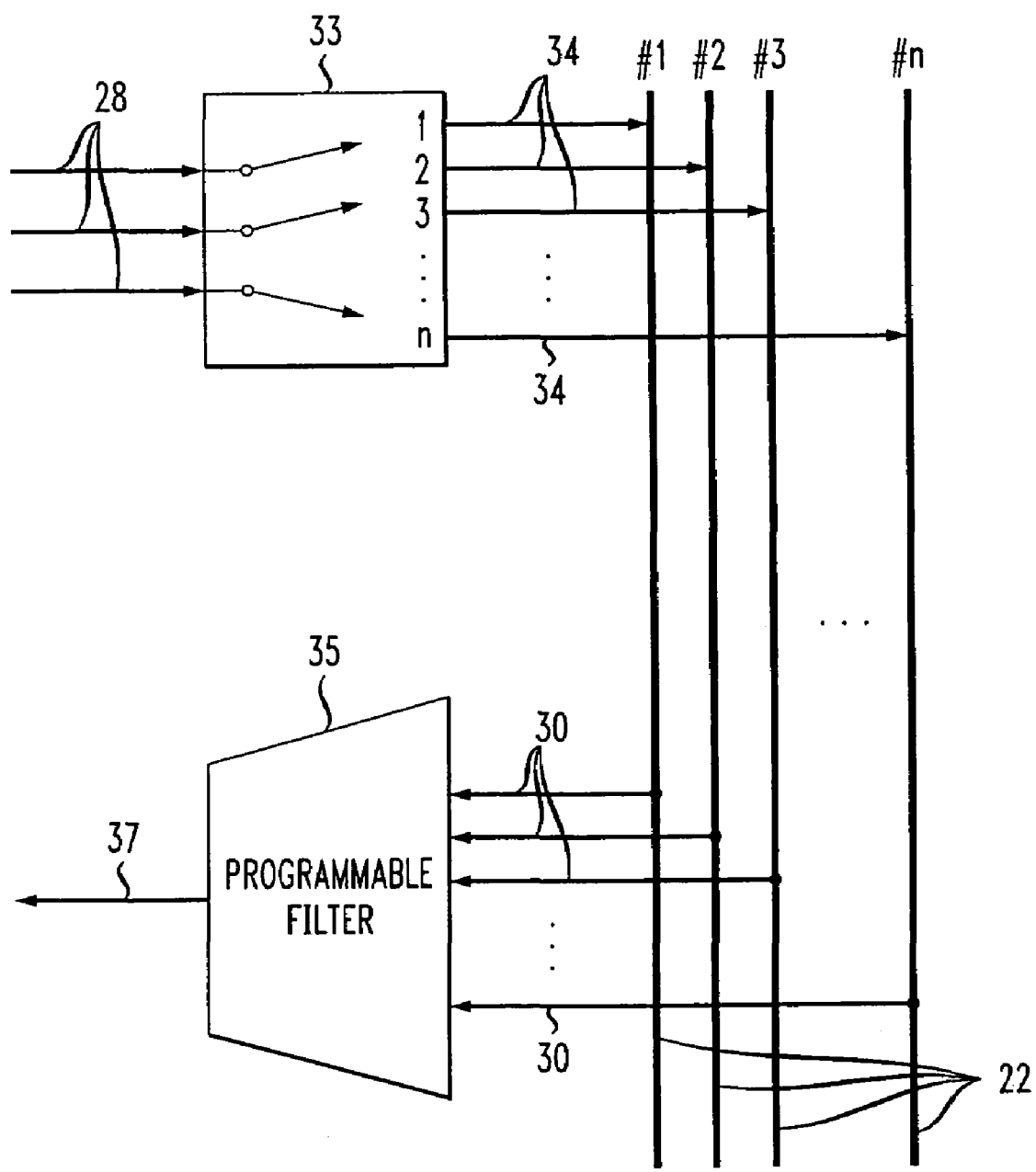
FIG. 1B is a schematic illustration of the connection between the cards and sub-busses of a modular switch, in accordance with a preferred embodiment of the present invention.

FIG. 1B is a schematic illustration of the connection between cards 24 and sub-busses 22 of modular switch 20, in accordance with a preferred embodiment of the present invention. Preferably, each card 24 has a predetermined number of links 28, e.g., three links, which are sufficient to allow the card 24 to transmit to sub-buses 22 at the maximal transmission capacity of the card. Links 28 preferably enter a controlled switch 33, which connects one or more of links 28 to sub-buses 22, for example through lines 34. Dynamically adjusted software instructions, as described hereinbelow, instruct controlled switch 33 to which sub-bus 22 (if at all) each link 28 should be connected.

Alternatively, each card 24 has output links 28 which connect to each of sub-buses 22, and software blocking methods are used to prevent card 24 from transmitting to sub-buses 22 it is not assigned. For example, each link 28 may be assigned to a different internal port of card 24 and the card writes to the internal ports which lead to the sub-buses 22 it is assigned.

In a preferred embodiment of the invention, respective input links 30 lead from each of sub-buses 22 to a programmable filter 35 which passes data from those sub-buses 22 the card 24 is assigned to listen to a wide line 37 which leads to the card. In a preferred embodiment of the invention, a plurality of wide lines 37 lead to different port groups of card 24. Preferably, the different port groups may be assigned different groups of sub-buses 22 to which they are to listen. In a preferred embodiment of the invention, programmable filter 35 operates using software filtering. Alternatively or additionally, programmable filter 35 operates using hardware switching.

Preferably, the number of sub-buses 22 in switch 20 is fewer than required to allow all of cards 24 to transmit concurrently at their maximal bandwidth capacity. Preferably, a controller 32 instructs each of cards 24 to which sub-buses 22 it may write, such that two cards 24 do not write to the same sub-bus 22 concurrently. In a preferred embodiment of the invention, controller 32 is implemented by one of cards 24 which is chosen dynamically such that at all times an operative card 24 is implementing the controller. Alternatively, a predetermined card 24 implements controller 32. Further alternatively, controller 32 is separate from cards 24. Preferably, the separate controller 32 is located in a box (not shown) containing switch 20.

In an exemplary embodiment of the invention, switch 20 comprises slots for up to fourteen cards 24. In a preferred embodiment of the invention, cards 24 may have different numbers of ports 26 according to the bandwidth capacities of the ports. Preferably, the total bandwidth capacity of cards 24 is the same regardless of the number of ports of the cards. Alternatively, each card has fifteen ports 26 which are divided into three groups of five ports each. Preferably, each card 24 has a maximal transmission capacity of 2.4 Gbps. In the exemplary embodiment, switch 20 comprises twenty three sub-buses 22, which all have the same bandwidth capacity of 0.8 Gbps. Thus, each card 24 is allocated one, two or three sub-buses 22 according to the momentary bandwidth needs of the card. It is noted, however, that the present invention is not limited to cases in which all of sub-buses 22 have the same bandwidth capacity.

In a preferred embodiment of the invention, switch 20 comprises a control bus 36 which is used for communication between cards 24 and controller 32. Preferably, controller 32 receives indications on the current bandwidth needs of some or all of cards 24 and accordingly allocates sub-buses 22 to the various cards 24. In a preferred embodiment of the invention, when a card 24 needs additional bandwidth it sends a message to controller 32 and requests one or more additional sub-buses. Preferably, when a card 24 does not need a sub-bus 22 it is allocated, the card sends a message to controller 32 foregoing the sub-bus 22. Alternatively or additionally, when controller 32 needs to allocate a sub-bus 22 to a card 24 and there are no unallocated sub-buses, the controller listens to the sub-buses to find an unused sub-bus. Alternatively, to cards 24 transmitting messages to controller 32 when their bandwidth needs change, cards 24 send periodic messages to the controller, as described hereinbelow.

In a preferred embodiment of the invention, two types of messages are transmitted on control bus 36, for the operation of controller 32. A first message type comprises client configuration messages (CCM) transmitted from cards 24 to controller 32, notifying the controller of the current bandwidth needs and/or the current sub-buses 22 allocated to the card 24. A second message type comprises master command messages (MCM) transmitted from controller 32 to cards 24, notifying them which sub-buses 22 they are allocated and/or instructing them to release one or more sub-buses 22. In a preferred embodiment of the invention, the MCMs and/or CCMs are transmitted using the UDP protocol which allows broadcast transmissions.

Preferably, each CCM includes all the information relating to the bandwidth needs and to the sub-buses 22 assigned to the transmitting card 24. Including all the information in each CCM simplifies the operation of card 32, especially when the card 24 implementing controller 32 is changed. Preferably, the information relating to the bandwidth needs and to the sub-buses 22 assigned to the transmitting card 24 is summarized in a relatively short record which is easily transmitted over bus 36. In a preferred embodiment of the invention, the CCMs comprise an identification of the card 24 transmitting the CCM, a minimal mandatory number of sub-buses 22 required by the card, a maximal number of buses the card can currently use, a priority of the card and a list of the sub-buses 22 currently allocated to the card.

Alternatively, the CCMs do not include the minimal mandatory number of sub-buses 22 required by the card, and the minimal mandatory number of sub-buses is given a default value of one. Further alternatively, the list of sub-buses 22 currently allocated to the card is not included in the CCMs as this information may be deduced, in some preferred embodiments of the invention, from the MCMs. In other preferred embodiments of the invention, the CCMs list the sub-buses 22 the transmitting card is forgoing.

Preferably, the priority of the card is determined based on the widths of the links connected to the card 24, such that cards which are connected to wide links have higher priorities than cards 24 which are connected to narrow links. Generally, cards 24 which connect to wide links are backbone cards which should receive precedence over cards connected to narrow links which are usually connected directly to end-stations. Alternatively or additionally, the priorities are determined based on the type of the card, such as the protocol of the card, i.e., whether the card transmits frames of variable length or cells of fixed length (e.g., Ethernet or ATM). Alternatively or additionally, the priorities are configured by a user based on the types of the end-stations connected to the card and/or other user considerations.

In some preferred embodiments of the invention, the MCMs include an array of records corresponding to each of cards 24. Each record preferably includes a list of sub-buses 22 and a number of sub-buses the card 24 is instructed to own. If the number of sub-buses 22 the card is instructed to own is equal to the number of sub-buses 22 in the list, card 24 is instructed to capture the sub-buses 22 in the list (if not already owned by the card) and free sub-buses which the card owns which are not in the list. If, the number of sub-buses 22 in the list is larger than the number of buses the card is instructed to own, the card must release an appropriate number of sub-buses 22 from the list according to its own choice.

Alternatively, each record states a list of the sub-buses 22 which the respective card 24 is instructed to own (including cards 24 it already owns), without listing a number of sub-buses. Further alternatively, each record comprises either a list of sub-buses 22 the respective card 24 is to capture or a number or list of sub-buses 22 the card is to release (a null list is preferably used when no changes are required), and no list of the sub-buses 22 owned by card 24 is sent in each MCM. Alternatively, a list of the sub-buses 22 owned by card 24 is sent periodically, for example, every fifth MCM.

Figure 2:
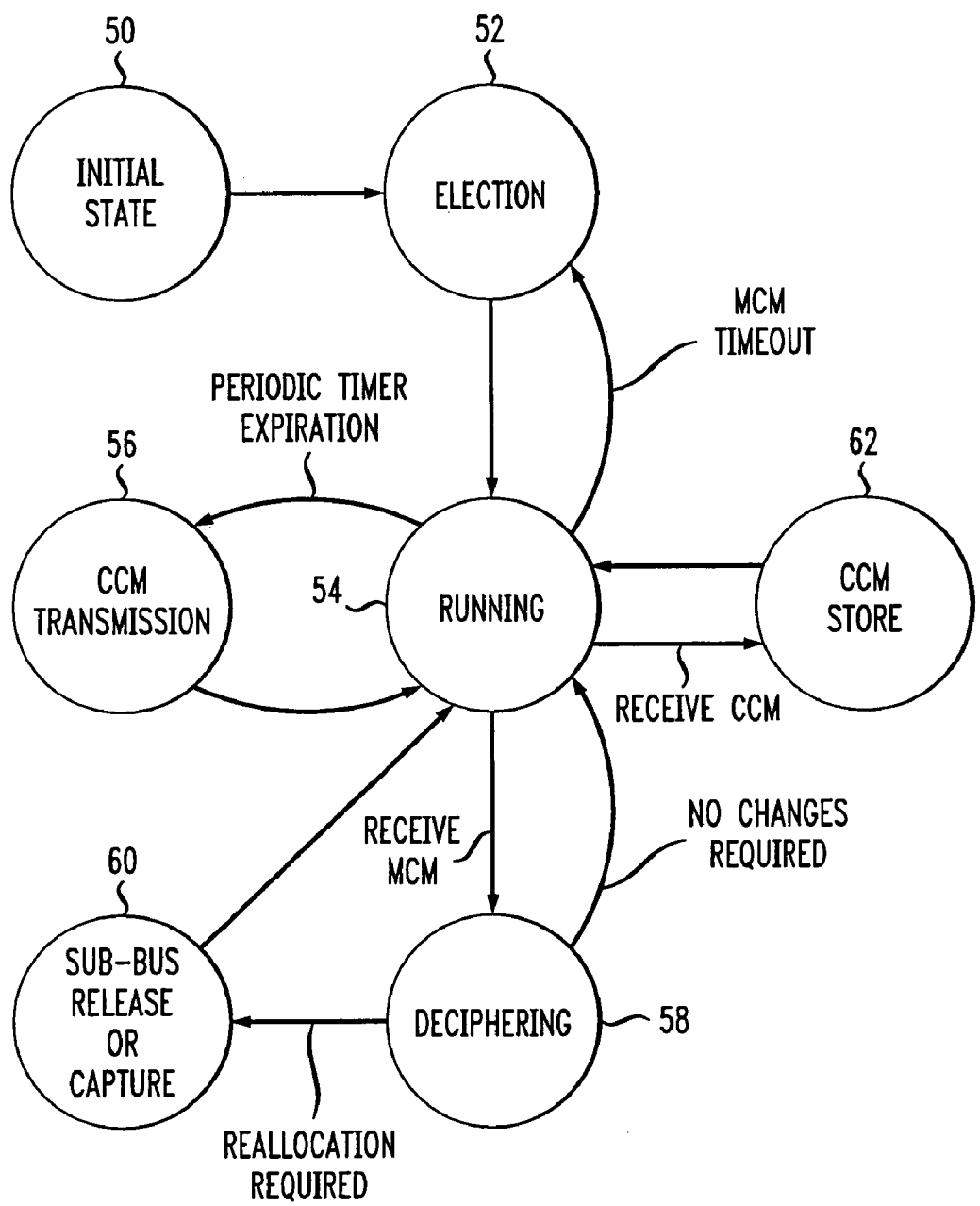
FIG. 2 is a state diagram of the operation of the cards of a modular switch, in accordance with a preferred embodiment of the present invention.

FIG. 2 is a state diagram of the operation of cards 24, in accordance with a preferred embodiment of the present invention. When a card 24 is inserted to switch 20, is operated or is otherwise initialized, the card is in an initial state 50. Card 24 moves from initial state 50 to a controller election state 52, in which the card determines whether it should operate as controller 32, as described hereinbelow. Thereafter, card 24 moves to a running state 54 in which the card waits for instructions from controller 32 and operates a timer which controls its generation and transmission of CCMs. Card 24 preferably moves to running state 54 regardless of whether it operates as controller 32. That is, the card 24 which operates as controller 32 runs, concurrently, the procedure of FIG. 2 and a procedure implementing controller 32, substantially without relation to each other.

Periodically, in running state 54, an internal timer of card 24 preferably moves the card to a CCM transmission state 56 in which card 24 generates and sends a CCM message on control bus 36. In a preferred embodiment of the invention, card 24 moves to CCM transmission state 56 between about every 1–4 seconds, e.g., 1.5 seconds. Alternatively or additionally, card 24 transmits a CCM when there is a substantial change in the bandwidth needs of the card, regardless of the internal timer of the card.

Upon receiving an MCM, card 24 moves to a deciphering state 58 in which the card deciphers that part of the MCM which is directed to it. If the deciphered instructions from the MCM require release or capture of one or more sub-buses 22, card 24 moves to a sub-bus change state 60 in which the release or capture is performed.

Preferably, in deciphering state 58 each card 24 only deciphers the record relating to it. The card 24 preferably compares the instructions in its respective record of the MCM to the sub-buses 22 it currently owns and operates accordingly, as described above.

If during running state 54 MCMs are not received for a predetermined time-out period, it is assumed that the card 24 implementing controller 32 failed or lost connection to the rest of the cards. Therefore, the card 24 not receiving the MCMs moves to controller election state 52 to select a new card 24 to implement controller 32. Preferably, the predetermined time-out period of not receiving MCMs is of a length in which at least between 2–4 MCMs should have been received, such that a single lost MCM does not cause a card 24 to move to election state 52. In a preferred embodiment of the invention, MCMs are transmitted substantially at the same rate as the CCMs.

In some preferred embodiments of the invention, each time a CCM is received from one of the other cards 24, card 24 moves to a store state 62, in which the card stores the CCM. The CCMs are preferably stored so that if the card 24 is elected to implement controller 32, the card has all the information required to immediately generate MCMs. Alternatively, the CCMs are stored only in the card 24 implementing controller 32 and in one or more backup cards 24 which are most likely to implement controller 32 if the card 24 currently implementing the controller, fails. The card 24 implementing controller 32 preferably transmits its CCMs on control bus 36 such that the other cards 24 will be able to store the CCMs.

Preferably, cards 24 store the most recent CCM of each card 24, and when a new CCM is received it is written over the older CCM from the same card. Alternatively or additionally to storing the received CCMs, cards 24 store the most recent MCM they receive.

Referring in more detail to controller election state 52, preferably the first card 24 entering election state 52 sends a query message to all the cards 24, asking who is currently implementing controller 32. If a response is received from a card 24 implementing controller 32, the querying card 24 moves to running state 54. If, however, a response is not received for a predetermined query period, the querying card 24 sends a request to all cards 24 to identify themselves with an identification number unique to each card (e.g., the address of the card on the backplane), and one of the cards is selected according to a predetermined rule, e.g., the card 24 with the lowest or highest number. Alternatively to the querying card sending an identifying request, all the cards 24 wait the time-out period from the controller query and then send their identification numbers.

In a preferred embodiment of the invention, in addition to the identification number, each card 24 transmits an indication of the version of the software of the card which implements controller 32. Preferably, controller 32 is selected from those cards 24 which have the most updated version.

Figure 3:
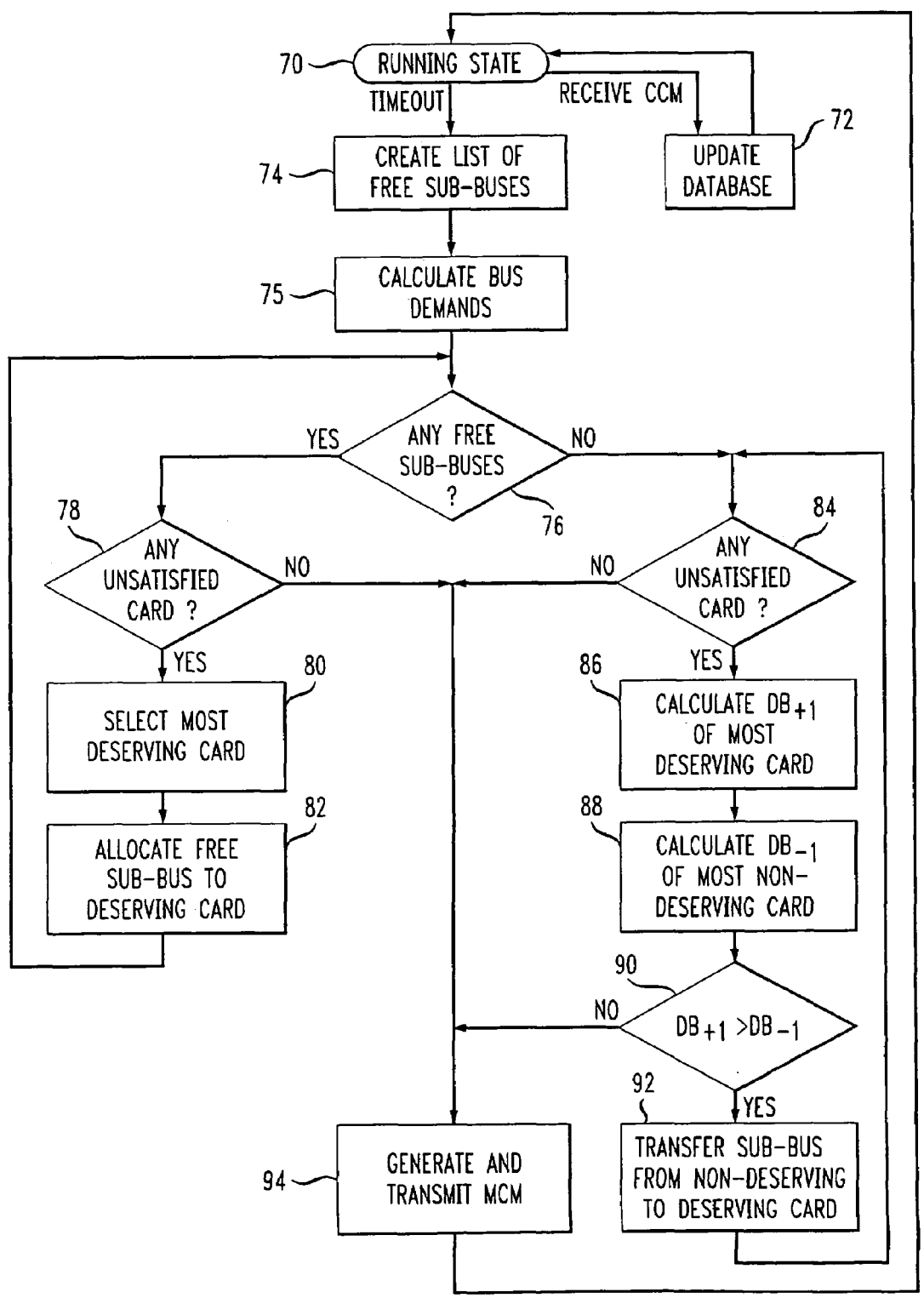
FIG. 3 is a flowchart of the operation of a switch controller, in accordance with a preferred embodiment of the present invention.

FIG. 3 is a flowchart of the operation of controller 32, in accordance with a preferred embodiment of the present invention. During the operation of controller 32, the controller waits for CCMs and for times in which MCMs are to be generated, in a running state 70. Upon receiving a CCM, controller 32 extracts any required information from the CCM and updates (72) a database 38 of the controller.

Reference is additionally made to FIG. 4 which is a schematic illustration of database 38, in accordance with a preferred embodiment of the present invention. Database 38 preferably comprises a table 100 which includes an entry 102 for each card 24 from which CCMs are received. Table 100 preferably comprises columns which list, for each entry 102, the sub-buses 22 currently owned by the respective card (104), the number (N) of sub-buses 22 owned by the card (and listed in column 104) (106), the number ($N_{des}$) of sub-buses 22 the respective card desires (108), the minimal number ($N_{min}$) of sub-buses 22 the card must have (110) and the priority (PR) of the card (112).

Preferably, controller 32 updates (72) columns 102, 104, 106, 108, 110 and 112 of table 100 based on the CCMs from the cards 24. The remaining columns of database 38 preferably receive values calculated by controller 32 as described below.

Preferably, as described above, controller 32 periodically transmits MCMs, for example, every 1.5 seconds. In a preferred embodiment of the invention, when a card 24 is elected to implement controller 32, it immediately generates an MCM, as in many cases the election is performed only after a relatively long period in which MCMs are not generated. Alternatively or additionally, cards 24 may generate urgent requests for bandwidth and in such cases controller 32 generates an MCM immediately. Preferably, the urgently generated MCM is transmitted only if it substantially changes the allocation of sub-buses 22.

Further alternatively or additionally, each time a predetermined number of CCMs are received, controller 32 updates database 38 and according to the update determines whether to transmit an MCM immediately or to wait for further updates or for a time-out.

Preferably, when it is time to transmit an MCM, controller 32 creates (74), in database 38, a list 98 of free sub-buses 22. Preferably, the list of free sub-buses 22 is created by finding those sub-buses 22 not listed in column 104 as currently allocated to any of cards 24. In a preferred embodiment of the invention, a card 24 which due to a failure cannot send CCMs, automatically disconnects from the sub-buses 22, so that the sub-buses 22 listed in list 98 are actually free. Alternatively or additionally, controller 32 listens to sub-buses 22 which were determined to be free to make sure they are not being used for at least a predetermined time. This prevents some errors which may occur when the connection of a card 24 to control bus 36 fails while the connection of the card to sub-buses 22 is operative.

Preferably, controller 32 calculates (75) a bus demand value (DB) for each entry 102 of table 100 and stores the DB in a column 114 of the table. Preferably, the bus demand value is a function of the priority (PR) and of the difference $N_{des}$-N of the card 24. In a preferred embodiment of the invention, DB=($N_{des}$-N)•PR. Thus, the bus demand of a card is proportionate to the priority of the card and to the difference between the number of sub-buses 22 the card desires and the number it has. When a card has the number of sub-buses 22 the card desires DB is zero, and when a card can forego one or more sub-buses 22, DB has a negative value.

In a preferred embodiment of the invention, DB is also a function of the minimal number ($N_{min}$) of sub-buses 22 the card must have. Preferably, the DB of a card which has less than the minimal number ($N_{min}$) of sub-buses 22 is very high (equivalent to infinity) so that a sub-bus is never confiscated from a card which only has $N_{min}$ sub-buses. The DB of cards which have at least $N_{min}$ sub-buses is preferably not affected by the value of $N_{min}$. In a preferred embodiment of the invention, DB is as described by the following equation:

$$DB = \begin{cases} (PR \cdot (N_{des} - N)) & N_{min} \leq N \\ \infty & N_{min} > N \end{cases}$$

If (76) there are free sub-buses 22, controller 32 checks whether (78) there are unsatisfied cards 24, i.e., cards which have a positive bus demand value (DB). If there is at least one unsatisfied card 24, controller 32 selects (80) a most deserving card among the unsatisfied cards, i.e., the card with the highest DB, and a free sub-bus 22 is allocated (82) to the most deserving card. Preferably, the allocated sub-bus 22 is erased from the list 98 of free sub-buses and is listed in a column 120 of allocated sub-buses in the entry of the most deserving card. The value of N of the card and consequently the value of DB of the card are preferably updated, accordingly, for the following calculations. Controller 32 then preferably returns to check if (76) there still are free sub-buses 22.

If no free sub-buses 22 remain controller 32 checks whether (84) there are one or more unsatisfied cards (i.e., cards with DB>0). If there are no unsatisfied cards, controller 32 proceeds to generate and transmit an MCM, as described hereinbelow.

If there are unsatisfied cards, controller 32 selects the most deserving card (i.e., the card with the highest DB) and calculates (86) for it a $DB+_1$ value (column 118, FIG. 4) which represents the DB of the card if it had another bus. Controller 32 then searches for the most satisfied (undeserving) card 24 and calculates (88) for it a $DB-_1$ value (column 116, FIG. 4) which represents the DB of the card if a bus is confiscated from it. Controller 32 then checks whether (90) $DB+_1$ of the most unsatisfied card is greater than $DB-_1$ of the most satisfied card. If the $DB+_1$ is not greater than the $DB-_1$, no more improvements may be made in the allocation of sub-buses 22 and controller 32 generates and transmits (94) an MCM, as described hereinbelow. If, however, the $DB+_1$ is greater than the $DB-_1$, controller 32 virtually transfers (92) a sub-bus from the satisfied card to the unsatisfied card. Preferably, the confiscation and allocation (92) is performed by reducing one from the number of sub-buses N of the satisfied card and adding one to the number of sub-buses N of the unsatisfied card. The list of sub-buses 22 of the satisfied and unsatisfied cards 24 preferably remain unchanged to prevent use of a sub-bus by two cards 24 at the same time, as described hereinbelow. Preferably, the DB values of the satisfied and unsatisfied cards are updated accordingly. Thereafter, controller 32 preferably returns to check whether (84) there are one or more unsatisfied cards.

Preferably, in generating (94) the MCM, controller 32 lists in the MCM for each card 24, the sub-buses 22 in its list 104 and the sub-buses 22 it was allocated, as listed in column 120. If the value N in column 106 is smaller than or equal to the number of listed sub-buses 22, this value of N is posted in the record of the card in the MCM. If, however, the value of N is higher than the number of listed sub-buses 22, the number of listed sub-buses is posted in the MCM as the N of the card. This is because the large value of N is due to sub-buses 22 which should be confiscated from other cards 24 and they cannot be allocated to the current card 24 until controller 32 is sure that the sub-buses 22 will not be used by the cards from which they were confiscated. Therefore, the actual allocation of the confiscated sub-buses 22 will only be performed in the next MCM.

In some preferred embodiments of the invention, when only a few cards are inserted into switch 20 such that each card 24 can receive all the sub-buses 22 it needs at maximal capacity, controller 32 divides the sub-buses according to a predetermined simple scheme. For example, controller 32 allocates each card 24 with the maximal number of sub-buses 22 it may need regardless of its current needs. Preferably, in these embodiments, only when a large number of cards 24 are inserted to switch 20 is the method of FIG. 3 used.

In some preferred embodiments of the invention, alternatively or additionally to receiving indications on bandwidth needs from cards 24, controller 32 listens to all of sub-buses 22 and accordingly determines which cards need more bandwidth and which need less. For example, controller 32 may determine which sub-buses 22 are heavily used, which are only lightly used and which are not used at all. A card 24 which heavily uses all the sub-buses 22 it is allocated probably needs more bandwidth, while cards which only lightly use or do not use at all the sub-buses they own are not in need of more bandwidth and may be able to forego one or more of their sub-buses 22.

As noted above, in some preferred embodiments of the invention, sub-buses 22 have different sizes so that the allocation of the sub-buses can more accurately fit the bandwidth needs of the various cards 24. In one of these embodiments, a table similar to table 100 is created in database 38, but instead of using bus numbers, bandwidth amounts are used. For example, instead of listing in columns 106 and 108 the number of owned sub-buses 22 and the number of desired sub-buses 22, the table lists the total bandwidth in the owned sub-buses 22 and the desired bandwidth of the card. The bus demand (DB) is preferably dependent on the difference between the desired and owned bandwidth. In allocating (82) a sub-bus to a card 24, the bus is preferably chosen as one with a bandwidth closest to the needs of the card. In some preferred embodiments of the invention, controller 32 switches between sub-buses allocated to different cards, if necessary to achieve a better allocation. In a preferred embodiment of the invention, sub-bus switching is performed only if the achieved allocation with the switching is substantially better than the allocation without the switching, in order to limit the number of switchings, as the switchings interrupt the operation of the switch. Preferably, in calculating $DB+_1$ and $DB-_1$ a minimal bandwidth difference between the bandwidths of sub-buses 22 is used, e.g., 0.1 Gbps. Alternatively, the calculation of $DB+_1$ and $DB-_1$ is performed for the size of the smallest sub-bus 22 allocated to the card 24 from which a sub-bus may be confiscated. Further alternatively, the bandwidth difference between $DB+_1$ and $DB-_1$ is chosen as a compromise between achieving a better allocation and limiting the number of switches. In a preferred embodiment of the invention, the extent to which switches are performed is configured by the user.

In some preferred embodiments of the invention, controller 32 instructs each of cards 24 to which sub-buses 22 the card is to listen. In a preferred embodiment of the invention, the instructions regarding the sub-buses 22 to which cards 24 are to listen are provided according to user settings preferably configured into switch 20 by a network manager. In a preferred embodiment of the invention, the network manager states for each card 24 to which other cards the card is to listen. Accordingly, controller 32 dynamically sets the sub-buses 22 to which a card 24 listens, according to the sub-buses currently assigned to the other cards 24 to which the card is to listen. Alternatively or additionally, the network manager states groups of cards 24 which listen to each other. Further alternatively or additionally, as described hereinbelow, controller 32 sets the sub-buses 22 to which a card 24 is to listen, according to the type (e.g., protocol) of the card 24.

In some preferred embodiments of the invention, the settings of which sub-buses a card 24 is to listen, depend on one or more parameters such as the time of day or the load on the switch. In a preferred embodiment of the invention, a first grouping of cards which is relatively liberal is configured for use during normal work hours, while a second, more stringent, grouping is used after work hours when there are more chances of deliberate security violations. In another preferred embodiment of the invention, when the switch is relatively loaded a first card grouping is used, while when less traffic passes through the switch a second grouping is used. This embodiment may be used to give higher priority to transmissions between certain groups.

Preferably, controller 32 instructs cards 24 to which sub-buses 22 they are to listen, in the MCMs. Alternatively, separate control messages are used to instruct cards 24 to which sub-buses 22 they are to listen. The separate control messages may be transmitted at different rates than the MCMs.

Alternatively to controller 32 instructing cards 24 to listen to specific sub-buses 22, a different controller than controller 32 instructs cards 24 to which sub-buses 22 they are to listen. Further alternatively, each card 24 is configured as to the cards it is to listen and the card determines by itself according to the MCMs, which sub-buses 22 are allocated to the cards to which it is to listen.

In some preferred embodiments of the invention, the configuration of the sub-buses 22 to which each card 24 listens, is used to divide switch 20 into a plurality of separate switches. Thus, switch 20 may be used as a single switch or as a plurality of switches with user defined sizes.

It is noted that the embodiments in which cards 24 listen to less than all the sub-buses 22 of a switch are not limited to use only in switches with dynamic sub-bus allocation. Rather, in a preferred embodiment of the invention, a switch which has a fixed allocation of sub-buses to which the cards transmit allows user configuration and/or dynamic adjustment of the sub-buses to which the cards listen.

In some preferred embodiments of the invention, cards 24 are configured to listen to less than all the other cards, for security reasons, in order to limit the flow of frames through a network based on switch 20.

Figure 5:
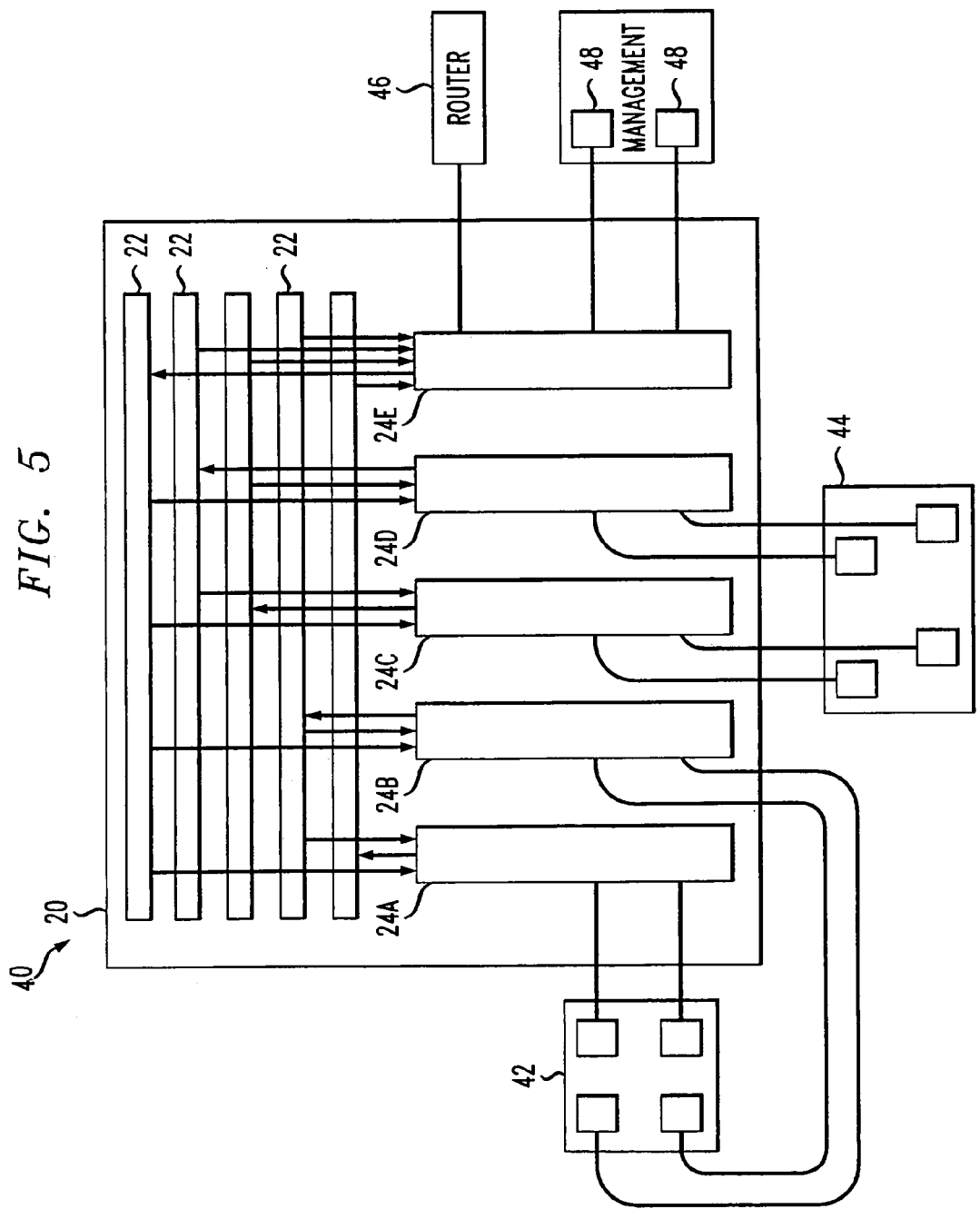
FIG. 5 is a schematic diagram of a network which illustrates the use of a modular switch for security, in accordance with a preferred embodiment of the present invention.

FIG. 5 is a schematic diagram of a network 40 which illustrates the use of switch 20 for security, in accordance with a preferred embodiment of the present invention. Computers of a first department 42 are preferably connected to cards 24A and 24B of switch 20. Computers of a second department 44 are preferably connected to cards 24C and 24D of switch 20. A router 46 and/or one or more management computers 48 are connected to a card 24E of switch 20. Cards 24A and 24B preferably listen only to messages from each other, and to messages from card 24E. Likewise, cards 24C and 24D listen only to messages from each other, and to messages from card 24E. As cards 24C and 24D do not listen to cards 24A and 24B, and vice versa, computers connected to cards 24C and 24D cannot transmit messages to computers connected to cards 24A and 24B, and vice versa. Thus, a worker from the first department 42 cannot send messages to computers of the second department 44 without the messages going through router 46 which checks the packets for security violations.

Figure 6:
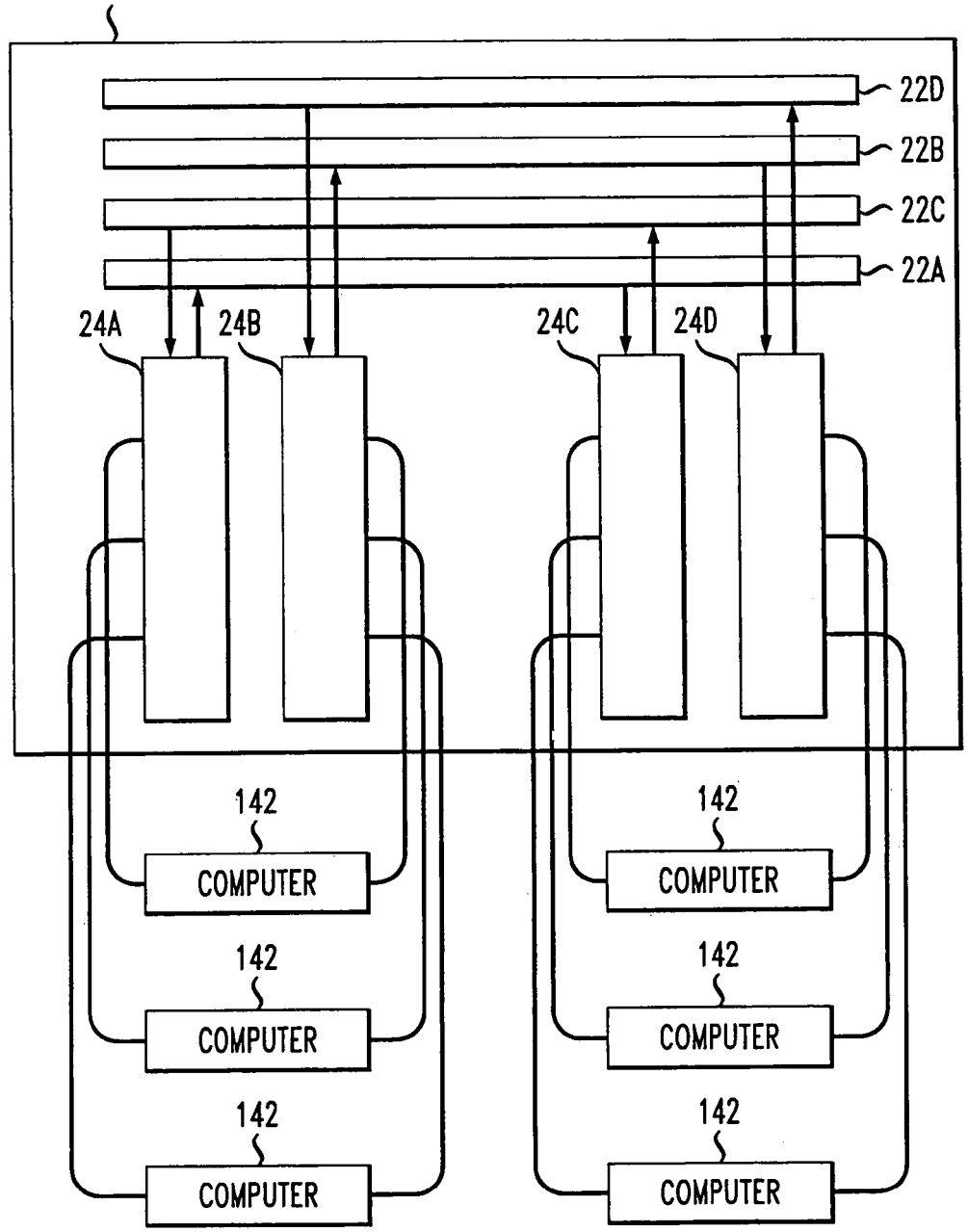
FIG. 6 is a schematic diagram of a network which illustrates the use of a modular switch for redundancy, in accordance with a preferred embodiment of the present invention.

FIG. 6 is a schematic diagram of a network 140 which illustrates the use of switch 20 for redundancy, in accordance with a preferred embodiment of the present invention. A plurality of computers 142 are preferably connected to each other through switch 20. Each computer 142 is preferably connected to ports 26 of two cards 24, for example to cards 24A and 24B or to cards 24C and 24D. In normal operation, computers 142 use, without loss of generality, their links to cards 24A and 24C and block their links to cards 24B and 24D. Alternatively or additionally, cards 24B and 24D block their ports to computers 142 during normal operation, using any blocking method known in the art, such as the method described in a U.S. application to Lior Shabtay et al., titled "Distributed Port-Blocking Method" and filed March 27, the disclosure of which is incorporated herein by reference.

For simplicity of the explanation, cards 24A, 24B, 24C and 24D are shown as transmitting to sub-buses 22A, 22B, 22C and 22D, respectively. It will be understand, however, that the allocation of the sub-buses may be in any other order and that cards 24 may be allocated more than one sub-bus 22. Cards 24A and 24C preferably listen to each other, i.e., card 24A listens to sub-bus 22C and card 24C listens to bus 24A. Likewise, cards 24B and 24D preferably listen to each other. Thus, if card 24A, for example, becomes faulty, computers 142 preferably activate their ports to cards 24B and 24D and block their ports to cards 24A and 24C. Thus, computers 142 can continue to communicate with each other without interference, even if card 24A constantly transmits interfering signals, which prevent listening cards from operating, on sub-bus 22A as cards 24B and 24D do not listen to sub-bus 22A.

Figure 7:
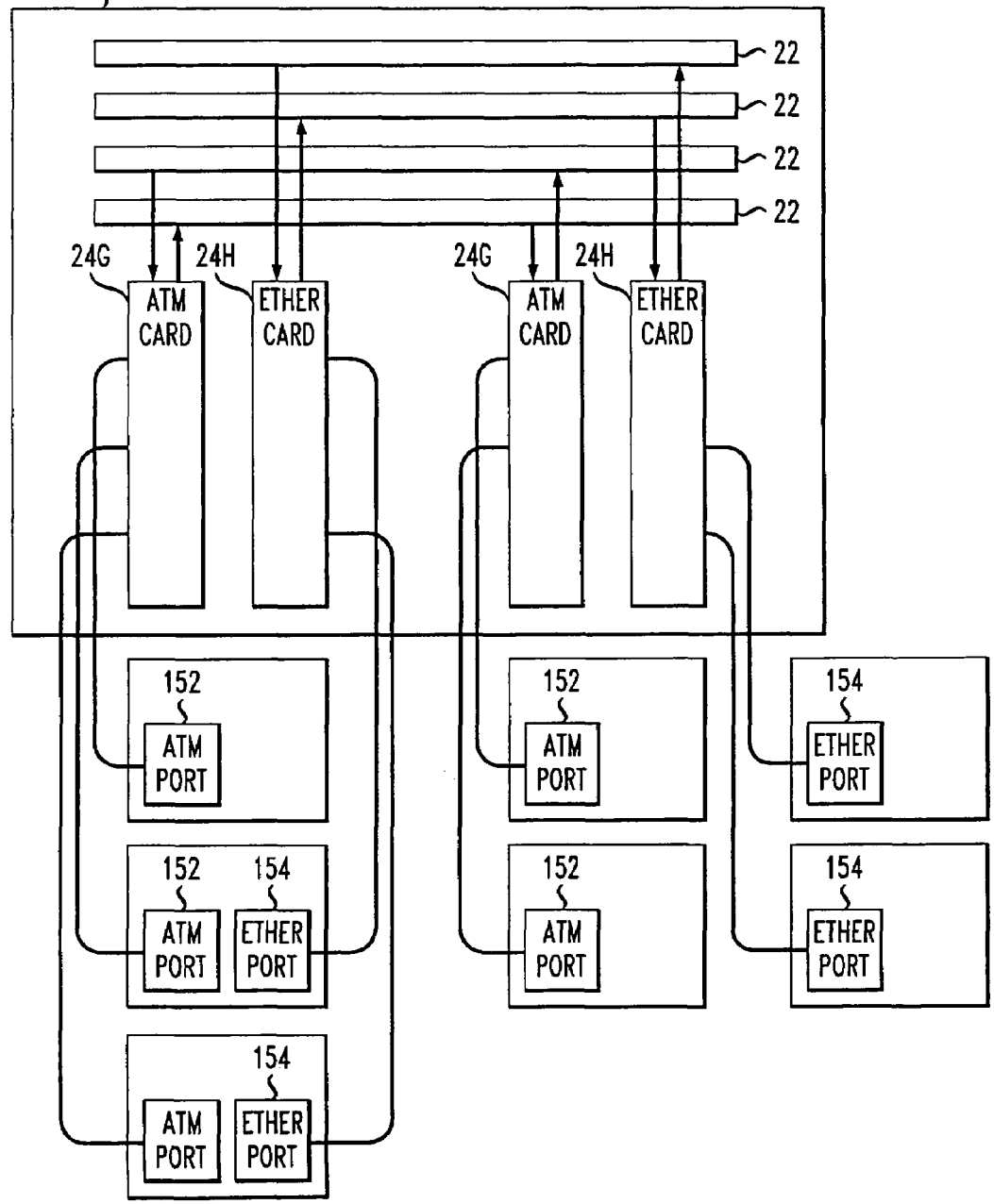
FIG. 7 is a schematic diagram of a network which illustrates the use of a modular switch for multi-protocol use, in accordance with a preferred embodiment of the present invention.

FIG. 7 is a schematic diagram of a network 150 which illustrates the use of switch 20 for connecting a plurality of devices communicating using different protocols, in accordance with a preferred embodiment of the present invention. Network 150 comprises a plurality of devices which have ATM ports 152 and/or Ethernet ports 154. ATM ports 152 are preferably connected to ATM cards 24G of switch 20, and Ethernet ports 154 are preferably connected to Ethernet cards 24H of switch 20. Preferably, each of sub-buses 22 can be transmitted to by either an ATM card 24G or an Ethernet card 24H. It is noted, however, that if a sub-bus 22 is transmitted to by an ATM card 24G Ethernet cards 24H cannot listen to the sub-bus 22. Alternatively, switch 20 comprises a plurality of different types of sub-buses 22 which may be used only by respective cards of the same type, e.g., ATM cards and Ethernet cards.

Thus, a single modular switch 20 is used for both ATM and Ethernet communication without predetermined definition of the percentage of the switch used for each protocol, i.e., ATM or Ethernet. For example, during a first period an organization using switch 20 may use it with about 50% ATM cards 24G and about 50% Ethernet cards 24H. Thereafter, the organization may change its preferences and use the switch 20 with any other division of ATM cards and Ethernet cards including using cards of only one type. In order to change the division all that is needed is additional cards of the required type and there is no need to change the box of switch 20. It is noted that the use of multiple protocol cards in a single switch is achieved without performing signal conversion between the protocols which is wasteful in time and in hardware.

In a preferred embodiment of the invention, the slots of switch 20 automatically identify the type (e.g., protocol) of the card inserted into them and accordingly update controller 32. Thus, controller 32 can automatically form groups of cards according to their types and instruct the cards to which sub-buses to listen, without requiring human configuration. In a preferred embodiment of the invention, each card 24 has a hard wired code, that identifies the type of the switch, which can be read by an on board unit of the box of the modular switch, when the card 24 is inserted to a slot of the switch.

It is noted that switch 20 may be configured to provide a combination of security, redundancy and/or multi-protocol use using a single modular switch 20.

It is noted that the present invention is not limited to implementation on modular switches but rather may be implemented on other types of modular bridging-devices and on other devices which use a backplane bus formed of a plurality of sub-buses.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of preferred embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

What is claimed is:

1. A modular switch comprising:
a plurality of backplane sub-buses;
a plurality of cards which are each allocated one or more of the backplane sub-buses; and
a controller which dynamically allocates the backplane sub-buses to the plurality of cards, based on bandwidth needs of the cards;
wherein the controller calculates, for each of the cards, a bus demand value which represents an entitlement and need of the card to receive a sub-bus, and the controller allocates free sub-buses which are not allocated to the cards with the highest bus demand values; and
further wherein the controller confiscates sub-buses from cards whose bus demand value without the confiscated sub-buses is lower than the bus demand value of a different card after the confiscated sub-buses are transferred to it.

2. The switch according to claim 1, wherein a bandwidth capacity of substantially all the backplane sub-buses is less than the sum of a maximal transmission bandwidth capacity of the cards.

3. The switch according to claim 1, wherein the controller is implemented by one of the cards.

4. The switch according to claim 3 wherein the controller is implemented by one of the cards which is selected dynamically.

5. The switch according to claim 1, wherein the cards transmit messages which indicate their bandwidth needs to the controller.

6. The switch according to claim 1, wherein each of the cards has a priority value which indicates its entitlement to bandwidth and the controller allocates the backplane sub-buses based on the priority values of the cards.

7. The switch according to claim 1, wherein substantially all the backplane sub-buses have the same bandwidth capacity.

8. The switch according to claim 1, wherein the plurality of backplane sub-buses comprise at least two sub-buses with different bandwidths.

9. The switch according to claim 1, wherein the controller confiscates one or more sub-buses from one or more of the cards when the one or more sub-buses are more needed by one or more other cards.

10. The switch according to claim 9, wherein the controller does not allocate a confiscated sub-bus to a card before it receives confirmation from the card from which the sub-bus was confiscated that the sub-bus was freed from its allocation.

11. A method of allocating sub-buses to cards of a switch, the method comprising the steps of:
determining bandwidth needs of each of the cards;
assigning each of the cards a bus demand value which is a function of the bandwidth needs of the card and the current bandwidth allocated to the card; and
allocating the sub-buses to the cards based on the bus demand values of the cards;
wherein allocating the sub-buses to the cards comprises confiscating sub-buses from cards which have lower bus demand values without the confiscated sub-buses than the bus demand values of other cards with the confiscated sub-buses.

12. The method according to claim 11, wherein determining the bandwidth needs of the cards comprises receiving messages from the cards.

13. The method according to claim 11, wherein determining the bandwidth needs of a card comprises determining a measure of utilization of the sub-buses currently allocated to the card.

14. The method according to claim 11, wherein determining the bandwidth needs of a card comprises listening to the sub-buses currently allocated to the card.

15. The method according to claim 11, wherein assigning each of the cards a bus demand value comprises assigning a bus demand value which is a function of a priority of the card.

16. The method according to claim 11, wherein assigning each of the cards a bus demand value comprises assigning a bus demand value which is a function of a minimal number of sub-buses which must be allocated to the card.

17. The method according to claim 11, wherein allocating the sub-buses to the cards comprises allocating sub-buses not currently allocated to a specific card as additional sub-buses to the cards with the highest bus demand values.

* * * * *